April 5, 1960 T. T. BUNCH 2,931,589
METHOD OF AND APPARATUS FOR REELING STRANDS
Filed Nov. 28, 1956 13 Sheets-Sheet 1
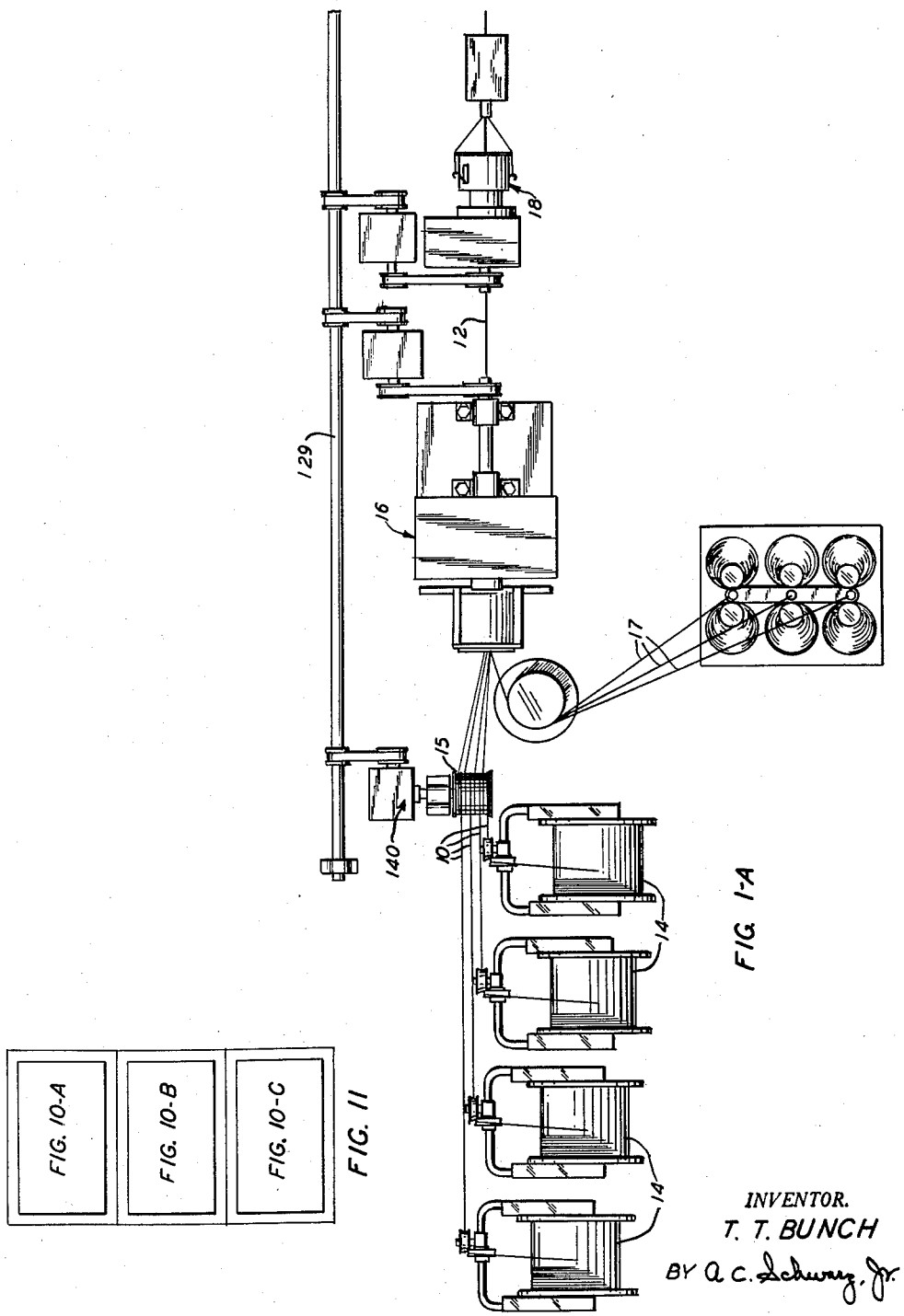
INVENTOR.
T. T. BUNCH
BY A. C. Schwarz, Jr.
ATTORNEY

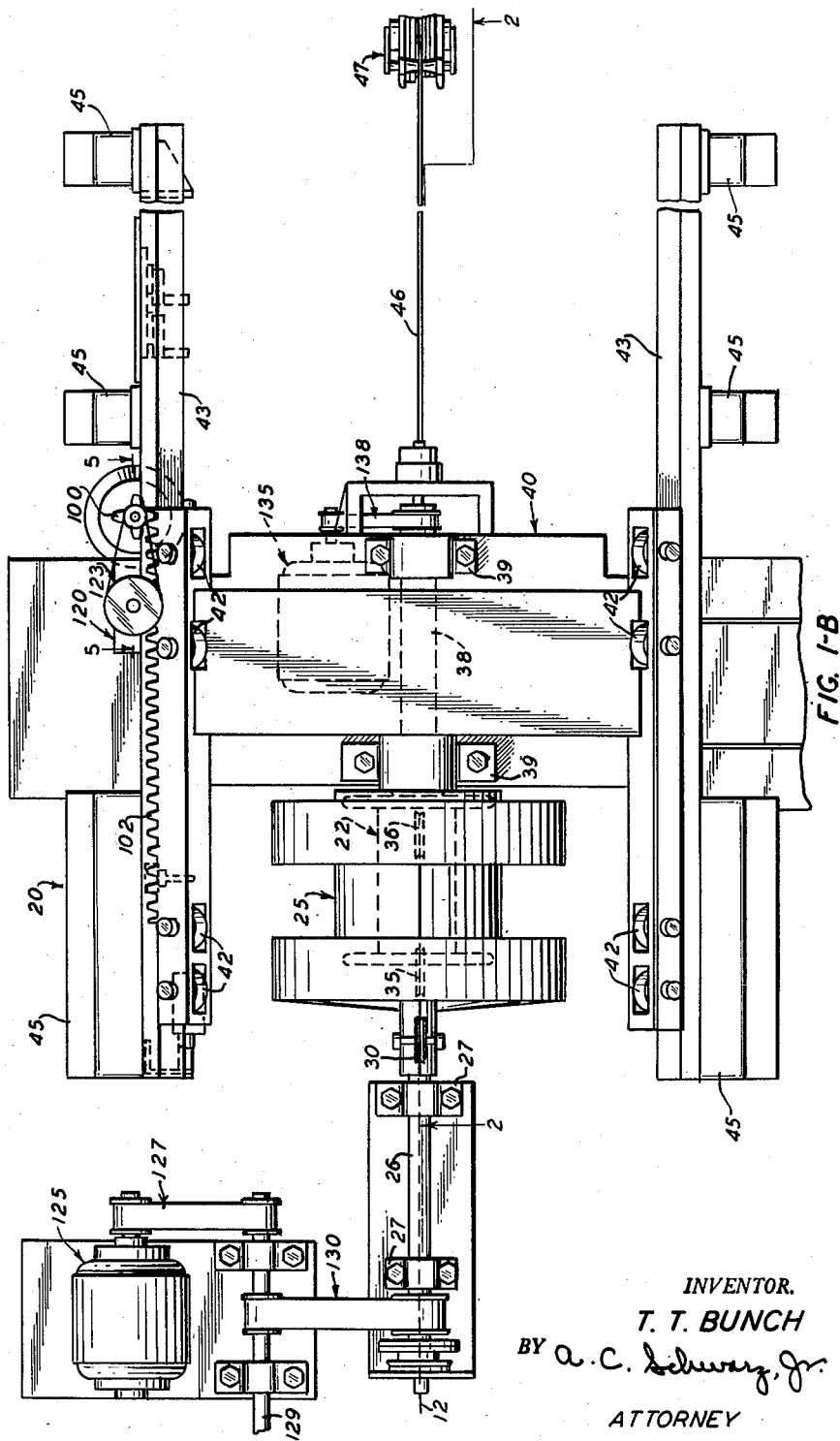

April 5, 1960    T. T. BUNCH    2,931,589
METHOD OF AND APPARATUS FOR REELING STRANDS
Filed Nov. 28, 1956    13 Sheets-Sheet 3

INVENTOR.
T. T. BUNCH
BY A.C. Schwarz, Jr.
ATTORNEY

April 5, 1960 T. T. BUNCH 2,931,589
METHOD OF AND APPARATUS FOR REELING STRANDS
Filed Nov. 28, 1956 13 Sheets-Sheet 4
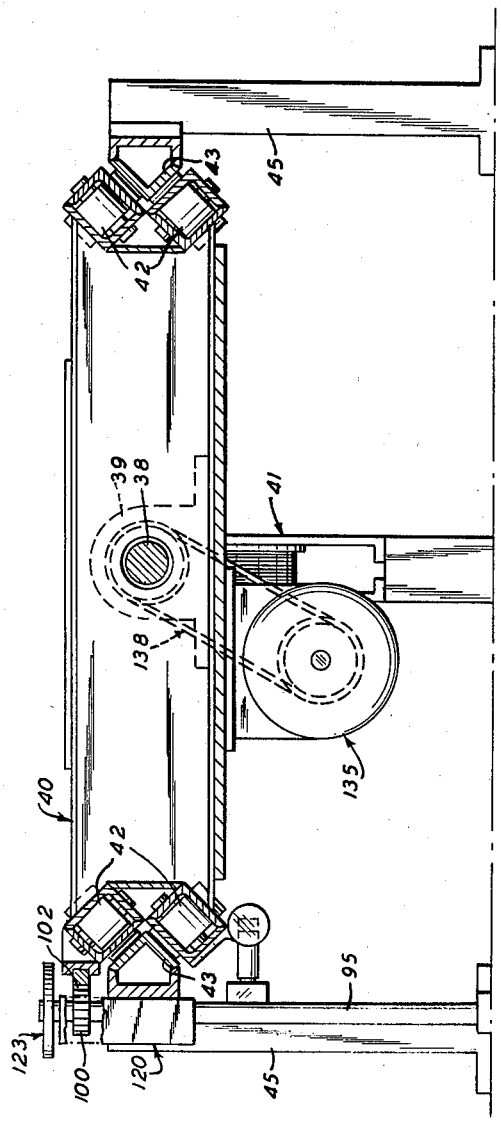
INVENTOR.
T. T. BUNCH
BY
ATTORNEY

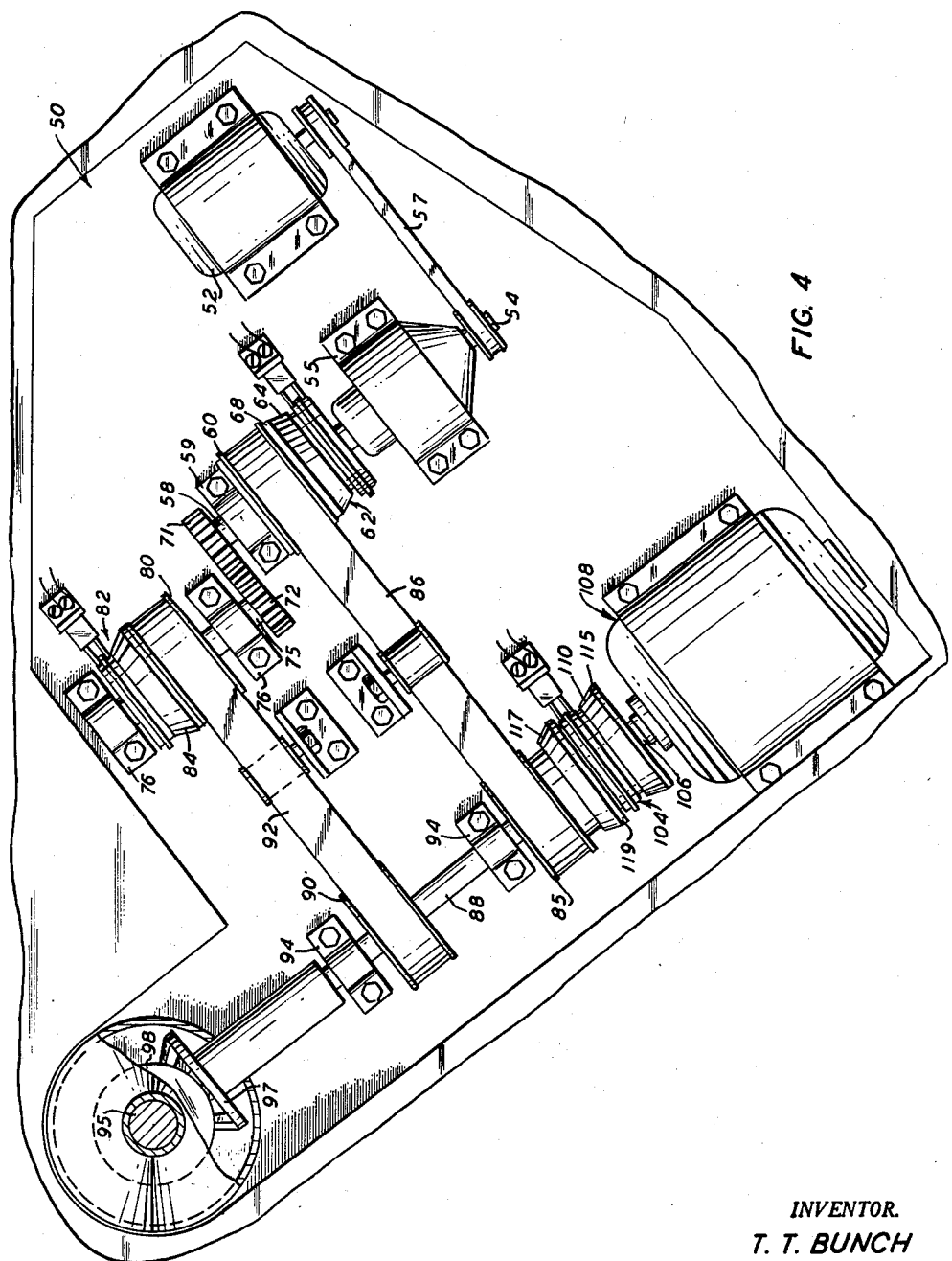

April 5, 1960  T. T. BUNCH  2,931,589
METHOD OF AND APPARATUS FOR REELING STRANDS
Filed Nov. 28, 1956  13 Sheets-Sheet 6

INVENTOR.
T. T. BUNCH
BY A.C. Schwarz, Jr.
ATTORNEY

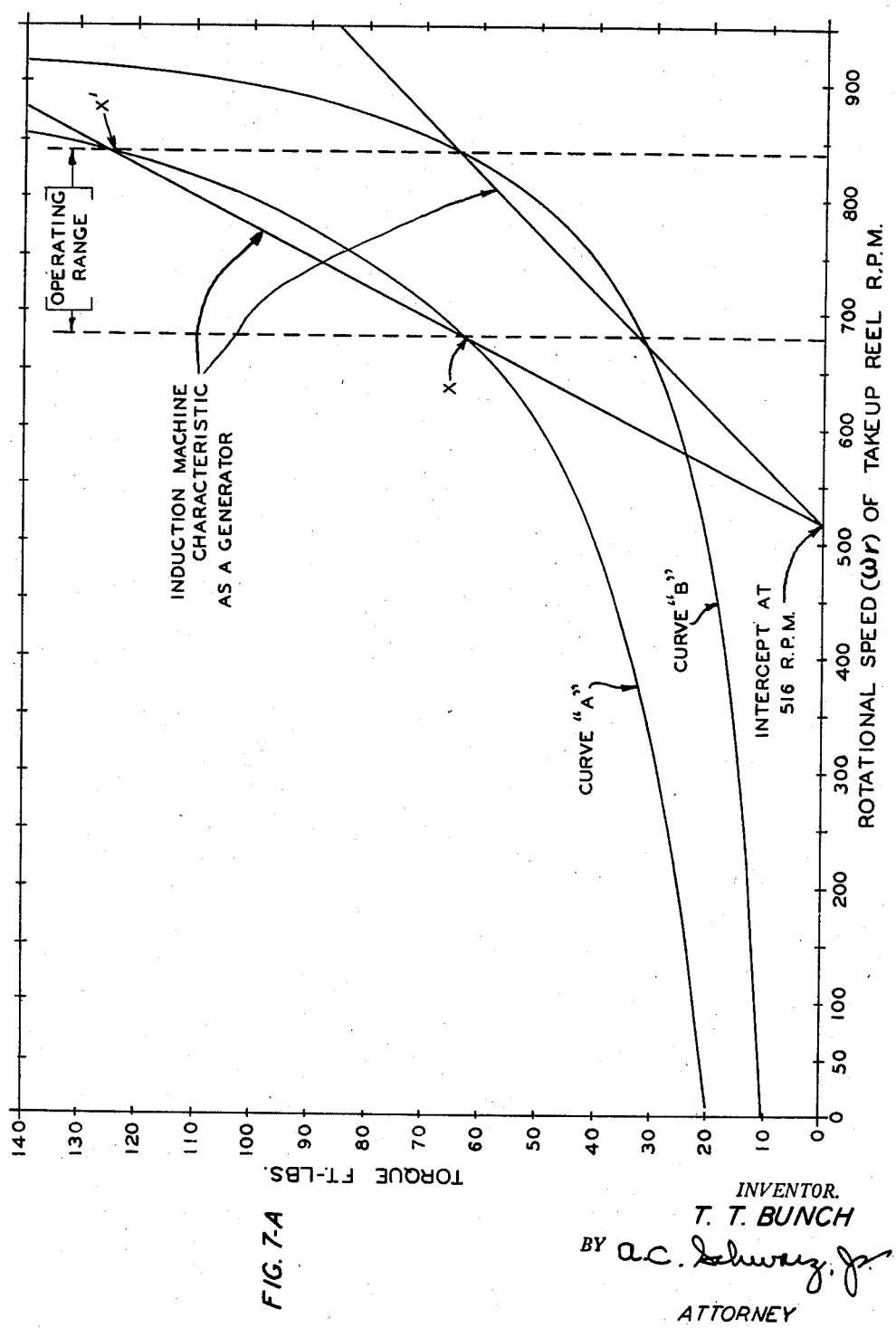
FIG. 7-A

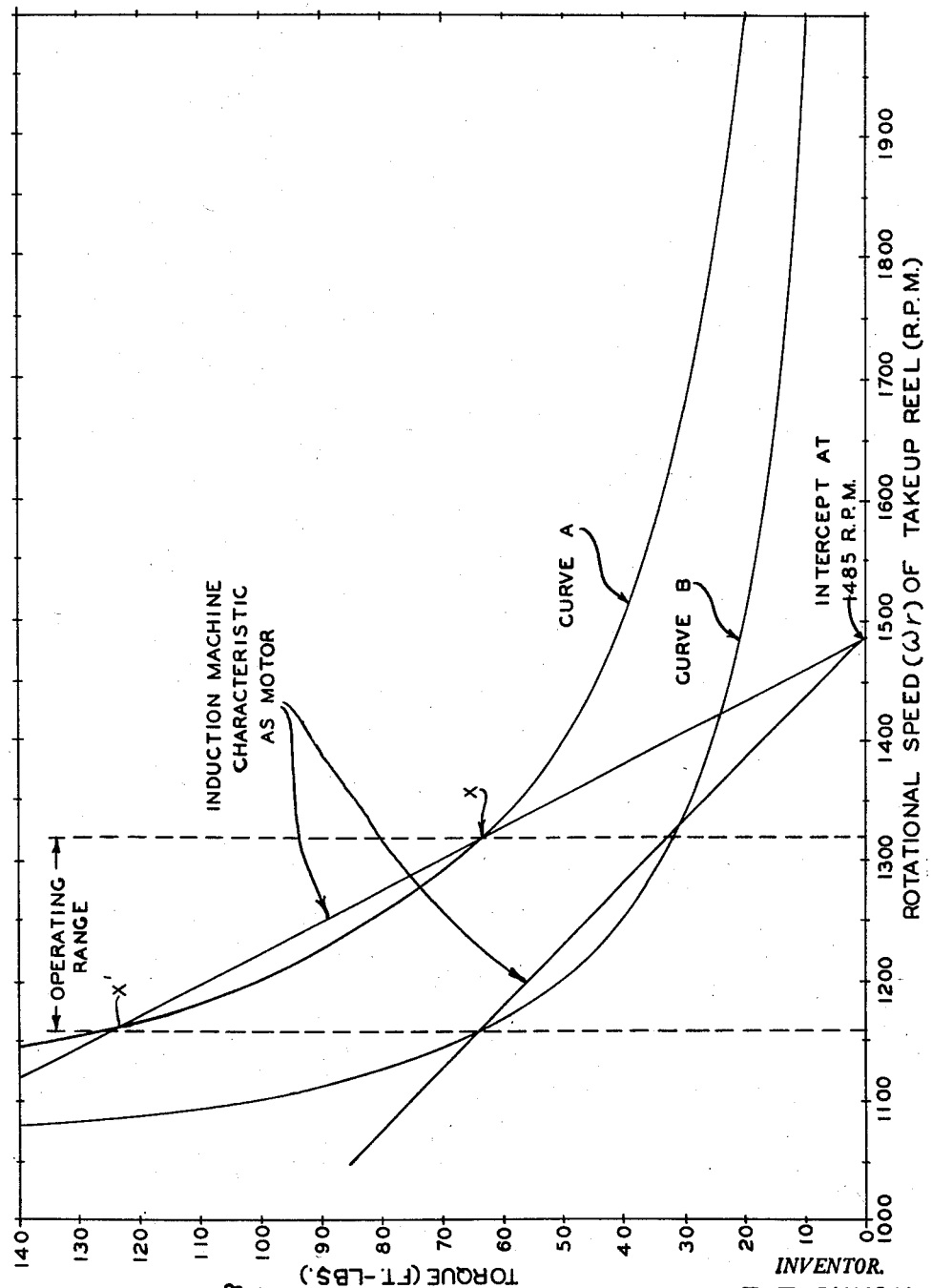

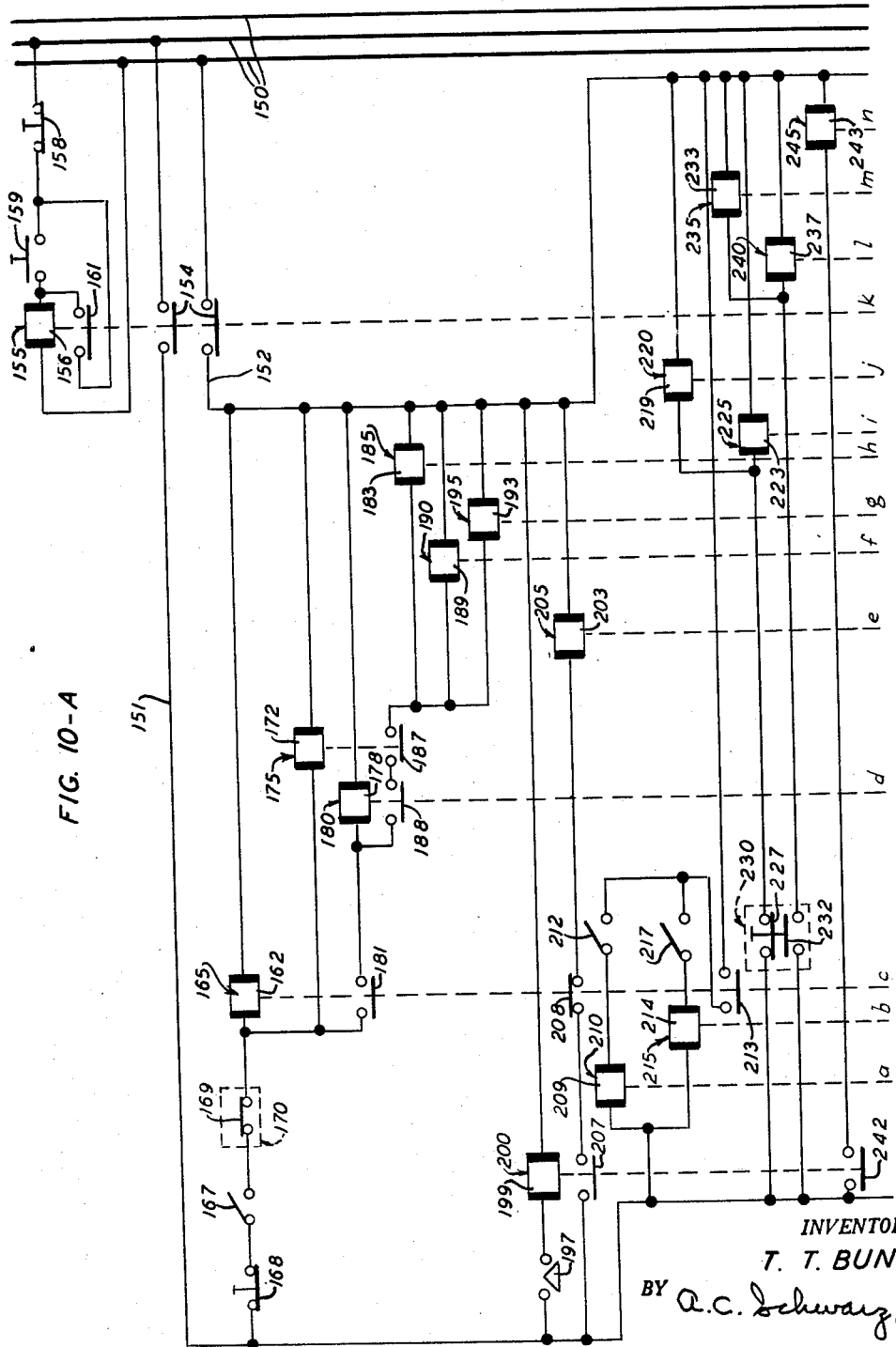

April 5, 1960 T. T. BUNCH 2,931,589
METHOD OF AND APPARATUS FOR REELING STRANDS
Filed Nov. 28, 1956 13 Sheets-Sheet 12
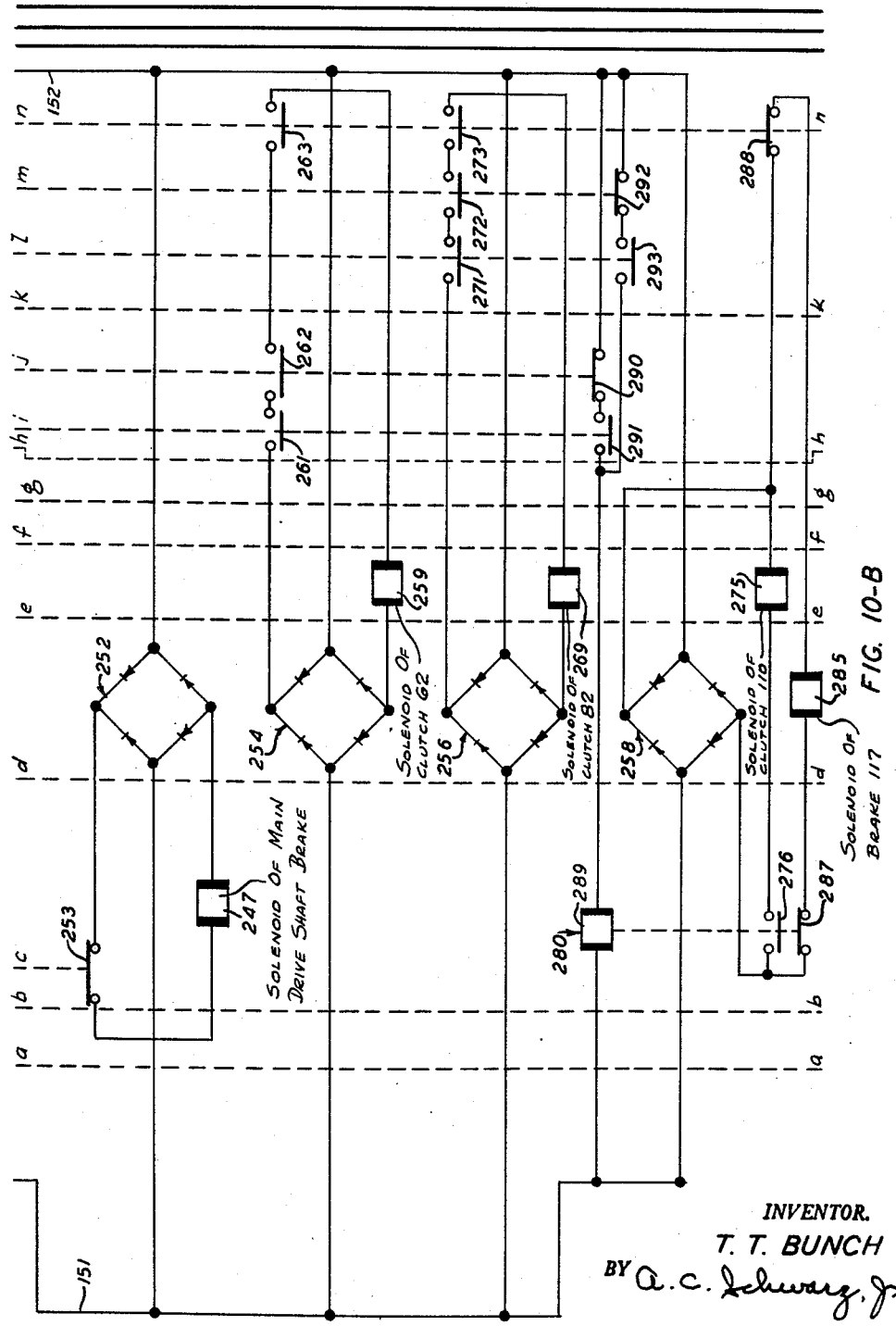
FIG. 10-B
INVENTOR.
T. T. BUNCH
BY A.C. Schwarz, Jr.
ATTORNEY

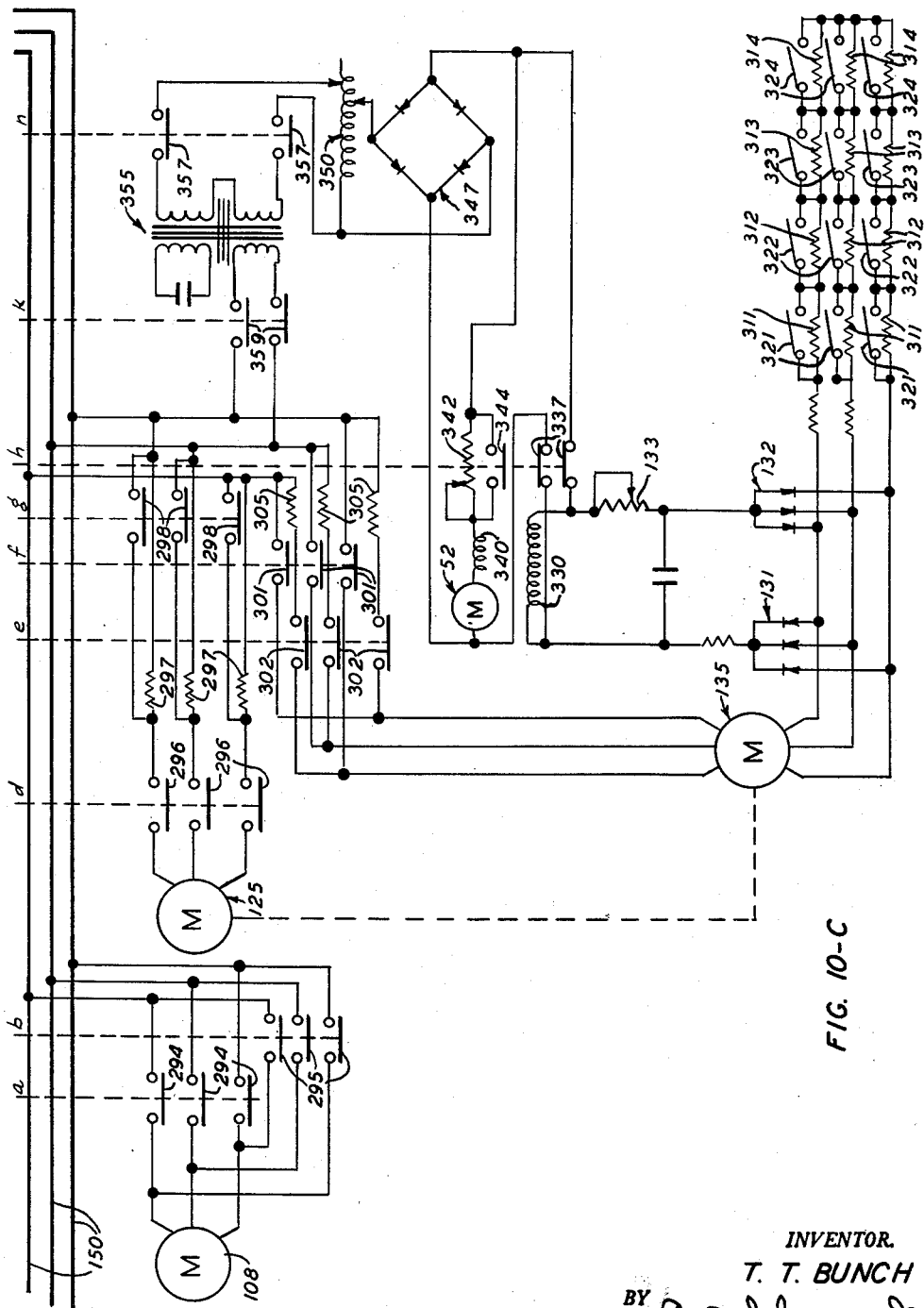
FIG. 10-C
INVENTOR.
T. T. BUNCH
BY a.c. Schwarz, Jr.
ATTORNEY

United States Patent Office 2,931,589
Patented Apr. 5, 1960

2,931,589

METHOD OF AND APPARATUS FOR REELING STRANDS

Tillman T. Bunch, near Ashland, Md., assignor to Western Electric Company, Incorporated, New York, N.Y., a corporation of New York Application November 28, 1956, Serial No. 624,873

14 Claims. (Cl. 242—25)

This invention relates to methods of and apparatus for reeling strands, and more particularly to methods of and apparatus for controlling the tension and distribution of a strand as it is wound upon a takeup reel.

In the manufacture of communications cables, a plurality of insulated conductors is twisted together to form a composite multiconductor cable core over which a suitable covering is applied. Such a cable core may be formed by a stranding machine having a capstan to advance the conductors and a takeup reel disposed to receive the finished cable core. In one type of stranding apparatus, the finished cable core is wound upon the takeup reel by a rotating, cup-like flyer. The takeup reel is mounted coaxially with respect to the rotational axis of the flyer and is reciprocated axially into and out of the flyer to distribute the cable core across its winding surface. The takeup reel is rotated, in the direction of rotation of the flyer, by the pull of the span of cable core that extends from the rotating flyer to the takeup reel. The tension in the cable core, as it is thus wound, is controlled by suitably braking the takeup reel. It is desirable in the operation of such apparatus, that the tension in the cable core be maintained substantially constant throughout the entire operation and that the distribution of the cable core upon the takeup reel be substantially uniform.

It is an object of this invention to provide new and improved strand reeling apparatus.

It is another object of this invention to provide new and improved apparatus for controlling the tension and distribution of a strand being wound upon a takeup reel.

A method of maintaining a desired tension in a strand being wound upon a rotatable takeup reel by a rotating flyer, which illustrates certain features of the invention, may include rotating the flyer at a speed which is variable or capable of being varied, delivering the strand to the flyer at a predetermined rate, and coupling the takeup reel and/or the flyer each in a fixed preselected rotational speed ratio to the rotor of an induction machine so that the rotor is driven at proportionally greater or smaller speeds above or below the synchronous speed of the induction machine as the winding radius of the takeup reel increases from an empty reel condition to a full reel condition. A voltage is applied to the stator of the induction machine and the induction machine is operated from an empty reel condition to a full reel condition in a range of speeds between the two breakdown torque speeds of the machine.

Strand reeling apparatus for maintaining a desired tension in a strand delivered at a desired rate and wound upon a rotatable takeup reel by a flyer rotating at a speed which is variable or capable of being varied, which illustrates certain features of the invention, may include an induction machine having a substantially linear speed-torque characteristic for a substantial portion of the range of speeds between the two speeds at which breakdown torque occurs. Means are provided for connecting the induction machine at a fixed rotational speed ratio to the takeup reel or the flyer whereby the induction machine is driven at proportionally greater or smaller speeds above or below its synchronous speed as the reeling operation proceeds from an empty reel condition to a full reel condition. The inherent speed-torque characteristic of the induction machine remains substantially linear from the empty reel speed of the takeup reel to the full reel speed thereof, the zero-torque speed of the takeup reel and the resistance in the rotor circuit of the induction machine being such that the tension on the strand is maintained at a predetermined value throughout the reeling operation.

A complete understanding of the invention may be obtained from the following detailed description of methods and apparatus forming specific embodiments of the invention, when read in conjunction with the appended drawings, in which:

Figs. 1–A and 1–B combined are a composite, fragmentary, plan view of stranding apparatus embodying certain features of the invention;

Fig. 3 is a vertical section taken along line 3—3 of Fig. 2, with parts thereof broken away for clarity;

Fig. 4 is an enlarged, horizontal section taken along line 4—4 of Fig. 2;

Figure 8:
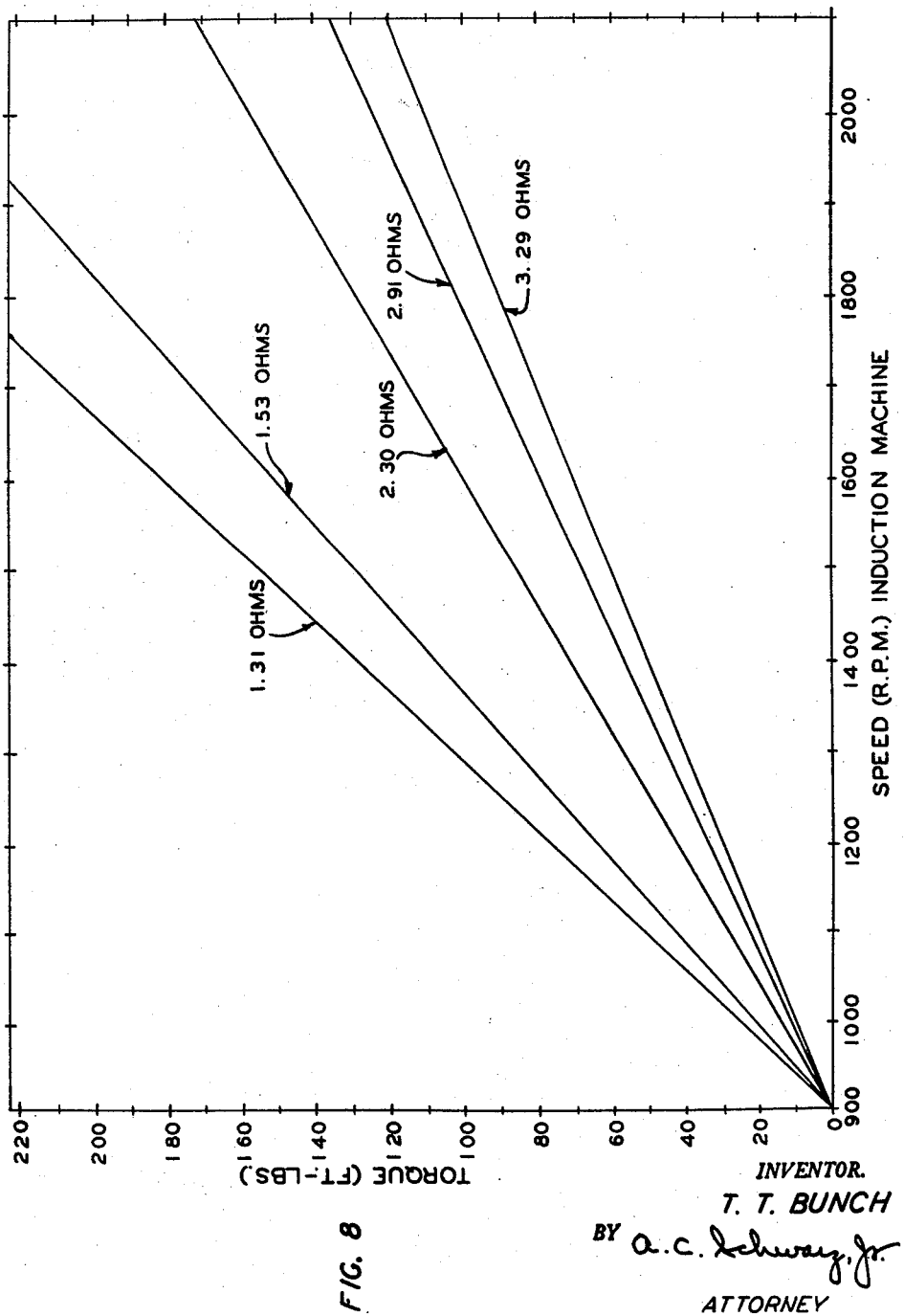
Figure 9:
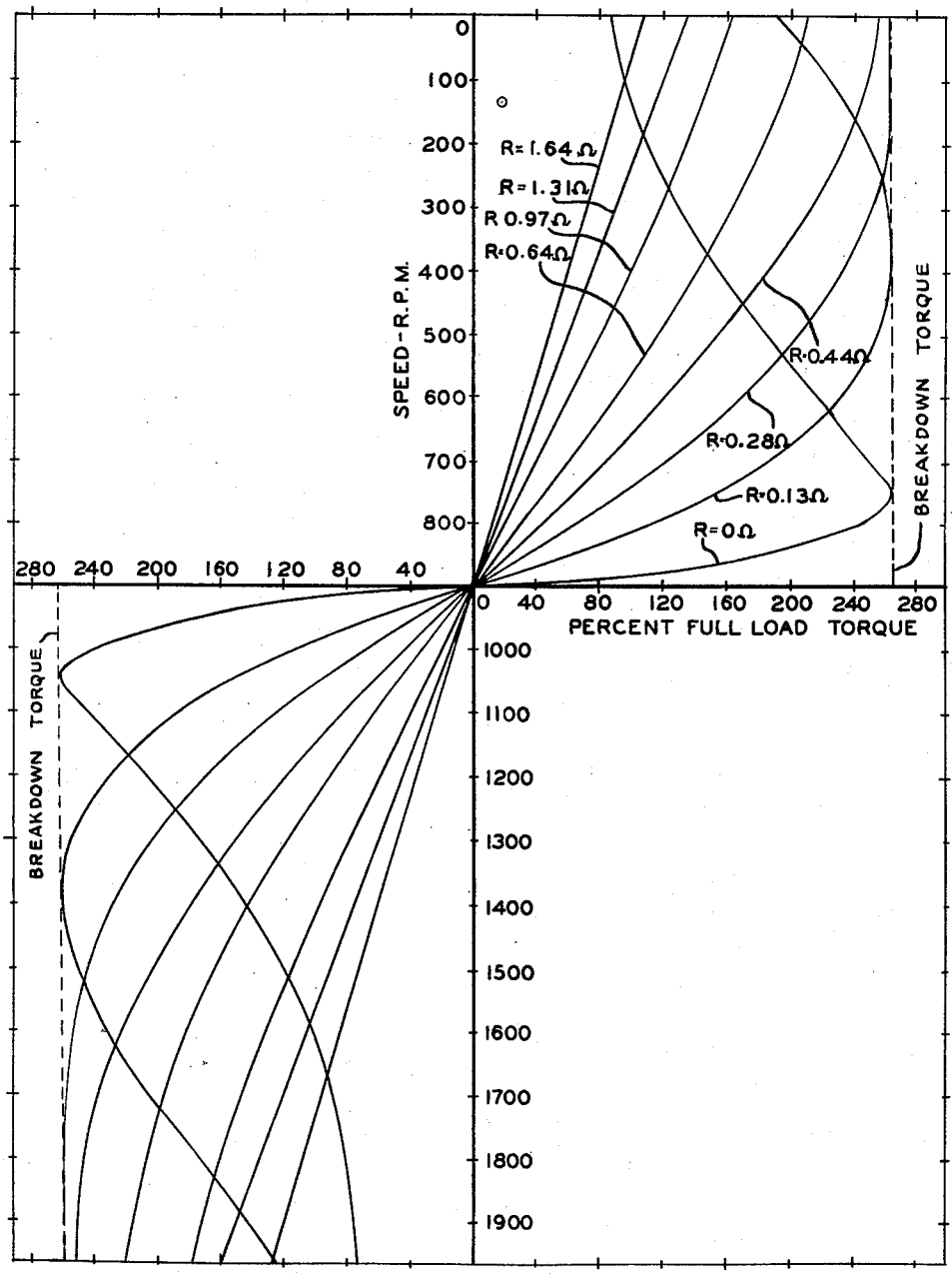

Figs. 7–A and 7–B are graphic illustrations of curves of rotational speed versus required braking and driving torques, respectively, for a takeup reel forming part of the stranding apparatus;

Fig. 8 is a graphic illustration of curves of speed-torque characteristics of a particular induction machine which is of a type of induction machine forming a part of the stranding apparatus;

Fig. 9 is a graphic illustration of curves of speed-torque characteristics of the particular induction machine over a greater speed and torque range than Fig. 8;

Figs. 10–A, 10–B and 10–C combined are a schematic representation of electrical circuits forming a part of the stranding apparatus, and Fig. 11 is a diagrammatic view showing how Figs. 10–A, 10–B and 10–C are arranged to complete the electrical circuit.

Referring now to the drawings, and in particular to Figs. 1–A and 1–B, there is shown stranding apparatus for twisting a plurality of insulated conductors 10—10 together to form a composite multiconductor cable core 12. The conductors 10—10 are withdrawn from a plurality of supply reels 14—14 located at the left-hand end of the stranding apparatus, as viewed in Fig. 1–A, and passed individually about a capstan or strand governing device 15 from whence they are directed to a conventional twisting unit, indicated generally at 16. The twisting unit 16 is designed to twist the conductors 10—10 together with filler strands 17—17 of jute, or the like, to form the cable core 12. From the twisting unit 16, the cable core 12 advances through a conventional binding head unit, indicated generally at 18, which is designed to apply a covering of suitable textile material about the cable core 12. The covered cable core 12 passes finally to a takeup unit, indicated generally at 20 (Fig. 1–B), which reels the finished cable core upon a takeup reel 22.

The takeup unit 20 includes a hollow, cup-like flyer 25 condition to a full reel condition. The linear speed of the cable core 12 is maintained substantially constant by virtue of the fact that the capstan 15, about which the conductors 10—10 are wrapped with sufficient turns to prevent slippage, is driven rotatably at a constant predetermined speed from the main drive shaft 129 through a suitable transmission, indicated generally as 140.

The expression for the braking torque required to insure a constant tension on the cable core 12 from an empty reel condition to a full reel condition may be derived and stated as follows:

$$T = \frac{FS}{2\pi} \frac{1}{(\omega_f - \omega_r)}$$

where:

$T$ = Braking torque (pound feet)
$\omega_f$ = Rotational speed of the flyer 25 (r.p.m.)
$\omega_r$ = Rotational speed of the takeup reel 22 (r.p.m.)
$F$ = Tension on the cable core 12 (pounds)
$S$ = Linear speed of cable core 12 (feet per minute)

The term $$\frac{FS}{2\pi}$$

in the above relationship is a constant since the tension ($F$) on the cable core 12 and the linear speed ($S$) of the cable core will be substantially constant.

From the above relationship, for given actual values of $\omega_f$, $F$, and $S$, the braking torque required for a desired constant tension on the cable core 12 at any rotational speed of the takeup reel 22 may be calculated. Referring to Fig. 7-A, there is shown, merely by way of an illustrative example, a curve designated "A" which represents a plot of the rotational speed ($\omega_r$) of the takeup reel 22 versus the required braking torque ($T$) for the following hypothetical conditions:

$S = 1000$ f.p.m.
$\omega_f = 1000$ r.p.m.
$F = 125$ lbs.

Referring now to Fig. 8 there are shown the speed-torque characteristics of the induction machine 135 for various, specific values of resistance in its secondary circuit. It will be understood that the induction machine 135 may be any typical, wound rotor, induction machine; however, for the purpose of this description it will be assumed that it is specifically a Fairbanks Morse type QVZK, Frame SF 445, 30 hp., three-phase, wound rotor, induction machine which has a full load torque of 181 pound-feet and a synchronous speed of 900 r.p.m. This particular induction machine is manufactured by Fairbanks Morse Company, Freeport, Illinois. Referring now to the speed-torque characteristics shown in Fig. 8, it may be observed that for torque loads up to and not greatly exceeding full load torque, the speed-torque characteristics of the induction machine 135 are essentially straight lines. It may be seen also that the slopes of the various curves, which represent the speed-torque characteristics for various values of resistance in the secondary circuit of the induction machine, are dependent upon the magnitude of the resistance in the secondary circuit. The linearity of the speed-torque characteristics of the induction machine 135, the direction of the slope and the dependence of the slope angle upon the value of the resistance in the secondary circuit permit the utilization of the inherent characteristics of the induction machine 135 to achieve a desired, substantially constant tension on the cable core 12 throughout the winding of the cable core upon the takeup reel 22.

To obtain the optimum speed-torque characteristic of the induction machine 135 required for a desired value of tension on the cable core 12, it is necessary to determine first the rotational speed ($\omega_r$) of the takeup reel 22 when it is empty and when it is full. Assuming, for example, that the winding diameter of the takeup reel 22 is approximately one foot at the empty reel condition and that it builds up to approximately two feet at the full reel condition, that the linear speed (S) of the cable core 12 is 1000 f.p.m., and that the roational speed ($\omega_f$) of the flyer is 1000 r.p.m.; the rotational speed of the takeup reel will increase throughout the reeling operation from approximately 682 r.p.m. to approximately 841 r.p.m. so that the difference between speed of the flyer and the speed of the reel will decrease as the diameter of the effective winding surface of the reel 22 increases. Referring again to Fig. 7-A, it may be seen that the rotational speeds of the takeup reel 22 at the empty reel condition and the full reel condition have been indicated on curve "A" by the designations X and X', respectively.

It may be seen that curve "A" (Fig. 7-A), which represents a plot of takeup reel speed ($\omega_r$) versus required braking torque, may be approximated very closely within the range of the entire operation, from the empty reel condition at X to the full reel condition at X' by a straight line, such as a straight line drawn through and including the points X and X', respectively. This straight line X—X' representing the desired performance of the induction machine 135, as shown in Fig. 7-A, has a mathematical slope of +.39 and, when extended, the line X—X' intercepts the abscissa at a point whereat the takeup reel speed ($\omega_r$) is 516 r.p.m. Although, for simplicity not used in the example, it is possible to tailor the straight line X—X' to the shape of curve "A," if desired, by inserting certain resistors in the secondary circuit of the induction machine, the resistors having resistances which decrease as the voltage across them increases, such as a silicon carbide resistor (trade name Thyrite) manufactured by General Electric Company.

By selecting a proper tie-in ratio (i.e. a ratio of 1:1.74 for the particular induction machine chosen) for the toothed, non-slip, belt transmission 138, the induction machine 135 has been geared so that it operates at its synchronous speed of 900 r.p.m. when the reel-supporting arbor 38 is rotating at 516 r.p.m. The resistance in the secondary circuit of the induction machine 135 is then adjusted to the proper value, which will achieve a torque versus slip characteristic having a slope of +.39 in reference to Fig. 7-A. From the torque versus slip characteristics shown in Fig. 8, it will be found that when there is a resistance of approximately 1.53 ohms in the secondary circuit of the induction machine 135, the desired torque-slip characteristic is realized.

It may be seen that this desired torque-speed characteristic of the induction machine 135 will assure operation on the linear portion of the characteristic throughout the range of operation to the full reel condition. Referring again to Fig. 7-A, it may be seen that the variations from the required braking torque (T) at intermediate reel conditions within the operating range will be very small, if not negligible, and the tension on the cable core 12 may be considered to be maintained substantially constant throughout the entire operating range.

If for some reason it should be desired to maintain a constant tension of 63 lbs. on the cable core 12, reference to a takeup reel, rotational speed versus required braking torque curve in Fig. 7-A, designated curve "B," for that value of tension, indicates that such a tension may be maintained substantially constant during the entire operation by inserting 2.91 ohms resistance in the secondary circuit of the induction machine 135. The linear portion of the torque-slip characteristic of the induction machine 135 with 2.91 ohms resistance in the secondary circuit has a mathematical slope of +.195 in reference to Fig. 7-A. Thus, it may be seen that a doubling of the required tension may be effected by merely changing the value of the resistance in the secondary circuit of the induction machine 135 to achieve a torque-slip characteristic, the linear portion of which has a slope of twice the magnitude of that of the original torque-slip characteristic. In this manner the tension may be preset at a desired value by adjusting properly the amount of resistance in the secondary circuit of the induction machine 135.

Referring now to combined Figs. 10-A, 10-B and 10-C, there is shown a schematic representation of an electrical circuit forming a part of the apparatus. The circuit includes 3-phase, A.C., bus lines 150—150, and single phase A.C. lines 151 and 152 which may be energized from the bus lines 150—150 by the closure of two normally open contacts 154—154 of a solenoid-operated relay 155. The relay 155 has an operating coil 156 which may be energized through a normally closed, push-button switch 158 and a normally open, push-button switch 159. The switch 159 is paralleled by a circuit including a normally open contact 161 of the relay 155.

An operating coil 162 of a solenoid-operated relay 165 may be connected across the lines 151 and 152 through a series connection of a normally open, "start" switch 167, a normally closed, "stop" switch 168 and normally closed contact 169 of a runout counter 170. An operating coil 172 of a time delay relay 175 is connected in parallel with the operating coil 162 of the relay 165. An operating coil 178 of a solenoid-operated relay 180 may be connected in parallel with the operating coil 162 of the relay 165 through a normally open contact 181 of the relay 165. An operating coil 183 of a solenoid-operated relay 185 may be connected in parallel with the operating coil 178 of the relay 180 through a series connection of a normally open contact 187 of the time delay relay 175 and a normally open contact 188 of the relay 180. An operating coil 189 of a solenoid operated relay 190 and an operating coil 193 of a solenoid-operated relay 195 are connected in parallel with each other and the operating coil 183 of the relay 185.

A centrifugally-operated, normally open switch 197 is connected in series with an operating coil 199 of a solenoid-operated relay 200 and when the switch 197 is closed it energizes the operating coil 199 from the bus lines 151 and 152. An operating coil 203 of a solenoid-operated relay 205 may be energized from the lines 151 and 152 through a series connection of a normally open contact 207 of the relay 200 and a normally closed contact 208 of the relay 165. An operating coil 209 of a solenoid-operated relay 210 is arranged to be energized by the closure of a normally open, cam-operated switch 212 when a series connected, normally open contact 213 of the relay 165 is also closed. The series arrangement of the operating coil 209 of the relay 210 and the switch 212 is paralleled by a series arrangement of an operating coil 214 of a solenoid-operated relay 215 and a normally open, cam-operated switch 217. The cam-operated switches 212 and 217 are components of the switching unit 120 (Fig. 5) and are operated by the cam shaft 122.

Figure 5:
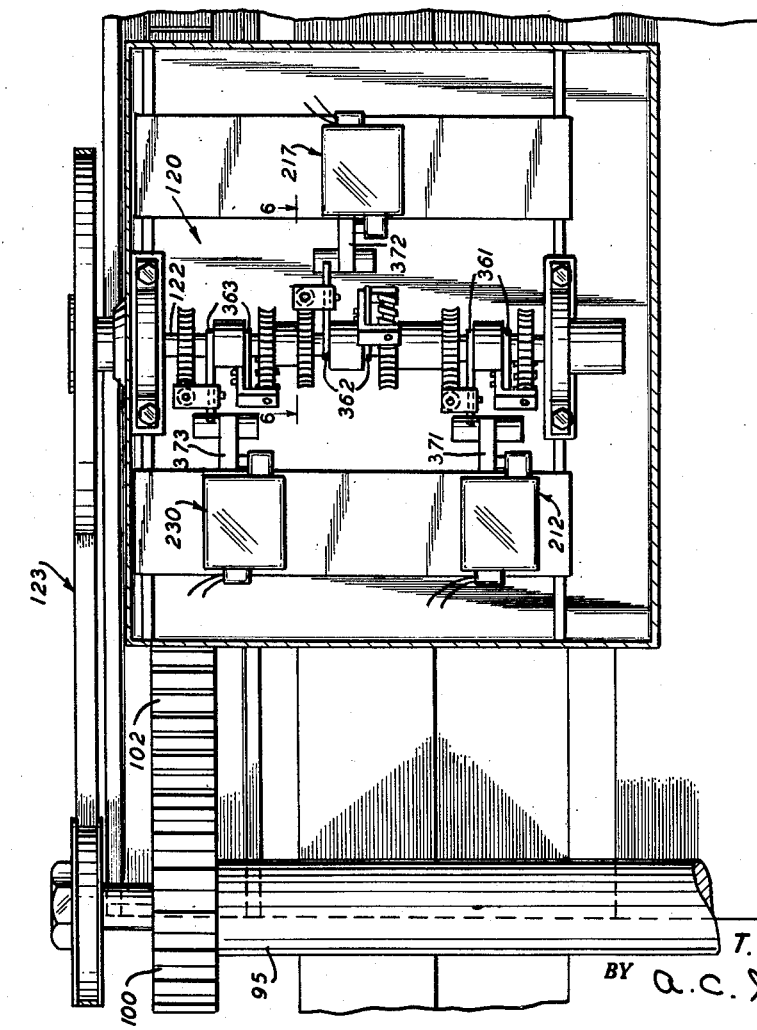
Fig. 5 is an enlarged, fragmentary, vertical section taken along line 5—5 of Fig. 1–B, with parts thereof broken away for clarity.

An operating coil 219 of a solenoid-operated, time-delay relay 220 and an operating coil 223 of a solenoid-operated relay 225 are connected in parallel across and may be energized from the lines 151 and 152 through a contact 227 of a two way cam-operated switch 230 forming a part of the switching unit 120 and operated by the cam shaft 122 (Fig. 5). Another contact 232 of the switch 230, which is open whenever the other contact 227 is closed and closed when the latter is open, is arranged to energize an operating coil 233 of a solenoid-operated, time delay relay 235 and an operating coil 237 of a solenoid-operated relay 240 by its closure. The relay 200 is provided with a second, normally open contact 242, the closure of which energizes an operating coil 243 of a solenoid-operated relay 245.

A solenoid 247 (Fig. 10-B) of an electromagnetic brake (not shown) associated with the main drive shaft 129 may be energized from the output terminals of a bridge rectifier 252 through a normally closed contact 253 of the relay 165. The input terminals of the bridge rectifier 252 are connected across the lines 151 and 152. The input terminals of three similar bridge rectifiers 254, 256 and 258 are likewise connected across the lines 151 and 152. A solenoid 259, forming part of the electromagnet assembly 64 of the electromagnetic clutch 62, may be energized from the output terminals of the bridge rectifier 254 through a series connection of normally open contacts 261, 262 and 263 of the relays 225, 220 and 245, respectively. The relay 220 is a time delay relay and its contact 262 will close after a predetermined time delay after energization of its coil 219. Similarly, a solenoid 269, forming a part of the electromagnet assembly 84 of the electromagnetic clutch 82, may be energized from the output terminals of the bridge rectifier 256 through a series connection of normally open contacts 271, 272 and 273 of the relays 240, 235 and 245, respectively. The relay 235 is a time delay relay and its contacts close after a predetermined time delay after energization of its coil 233.

The electromagnetic assembly 110, forming a part of the clutch-brake coupling 104, is provided with a clutch solenoid 275. The clutch solenoid 275 is designed to be energized from the output terminals of the bridge rectifier 258, upon closure of a normally open contact 276 of a solenoid-operated relay 280, to engage the clutch armature disc 115 mechanically with the electromagnet assembly 110. A brake solenoid 285 for the booster motor 108, forming part of the electromagnetic assembly 117, may be energized from the output terminals of the bridge rectifier 258 through a series connection of a normally closed contact 287 of the relay 280 and a normally closed contact 288 of the relay 245. The relay 280 has an operating coil 289 which may be energized through a normally closed contact 290 of the time delay relay 220 and a normally open contact 291 of the relay 225 or through a normally closed contact 292 of the time delay relay 235 and a normally open contact 293 of the relay 240.

The booster motor 108 (Fig. 10-C) is arranged to be connected to the three-phase, bus lines 150—150 either by the closure of normally open contacts 294—294 of the relay 210 or by the closure of normally open contacts 295—295 of the relay 215. The booster motor 108 when energized through the contacts 294—294 runs in a forward direction and, conversely, runs in the reverse direction when energized through the contacts 295—295. The main drive motor 125 is energized from the bus lines 150—150 by the closure of normally open contacts 296—296 of the relay 180. Starting resistors 297—297 are designed to be shunted by the closure of normally open contacts 298—298 of the relay 195.

The primary circuit of the induction machine 135 is arranged to be connected to the bus lines 150—150 by the closure of normally open contacts 301—301 of the relay 190. The primary connections can be reversed by the closure of normally open contacts 302—302 of the relay 205 instead of the contacts 301—301. Suitable plugging resistors 305—305 are provided in series with the contacts 302—302. The secondary circuit of the induction machine 135 includes a series of resistors 311—311, 312—312, 313—313 and 314—314 in each of the three phases thereof. As shown in Fig. 10-C, the resistors 311—311 may be shorted out of the secondary circuit of the induction machine 135 by the closure of a set of ganged, manually-operated, normally open switches 321—321. Similarly the resistors 312—312, 313—313 and 314—314 may be eliminated from the secondary circuit by the closure of switches 322—322, 323—323 and 324—324, respectively.

The distributor drive motor 52, which is a shunt wound, D.C. machine, is designed to operate with its shunt field excited either by a constant voltage D.C. source or by a rectified D.C. voltage supplied from and proportional to the secondary circuit voltage of the induction machine 135. As shown in Fig. 10-C, a shunt field winding 330 of the motor 52 is connected to the three phases of the secondary circuit of the induction machine 135 through three-phase rectifier units 131 and 132, in series with an adjustable resistor 133. The shunt field winding 330 may be connected in parallel with the armature circuit of the motor 52 for self-exitation through normally closed contacts 337—337 of the relay 185. The armature circuit of the motor 52 includes a small, series, compensating winding 340 and a series connected, adjustable resistor 342. The resistor 342 is cut out of the armature circuit by the closure of a normally open contact 344 of the relay 185.

An adjustable, constant voltage is designed to be applied across the armature circuit of the motor 52 from the output terminals of a bridge rectifier 347, the input terminals of which are energized from an autotransformer 350. The autotransformer 350 is energized from the secondary of a constant voltage transformer 355 by the closure of normally open contacts 357—357 of the relay 245, and the primary of the constant voltage transformer 355 is energized from the bus lines 150—150 by the closure of normally open contacts 359—359 of the relay 155.

Referring again to Fig. 5, the switching unit 120 is designed to control the operation of the switches 212, 217 and 230 in accordance with the movements of the distributor carriage 40. As mentioned previously the cam shaft 122, which forms a part of the switching unit 120, is driven from the distributor drive shaft 95. Adjustably mounted on the cam shaft 122 are a plurality of pairs of cams 361—361, 362—362 and 363—363 designed to strike and throw operating levers 371, 372 and 373, respectively, of the switches 212, 217 and 230, respectively, at predetermined positions of the cam shaft. The switches 212, 217 and 230 are of the Snap-Lock type which can be modified so that when they are thrown in one direction, they remain in that position until thrown in the opposite direction to the other position. The "Snap-Lock" switches are manufactured by the National Acme Company, Cleveland, Ohio.

The switch 212 is actuated and closed by one of the pair of cams 361—361 as the distributor carriage 40 nears the end of its forward traverse and is actuated and reopened again by the other cam 361 after the distributor carriage 40 is moving in the reverse direction solely under power from the distributor motor 52. The switch 217 is actuated and closed by one of the pair of cams 362—362 as the distributor carriage 40 nears the end of its reverse traverse and is opened again by the other cam 362 after the distributor carriage 40 is moving in its normal fashion in the forward direction solely under power from the distributor motor 52. The switch 230 is actuated by one of the pair of cams 363—363 to open its contact 227 and to close its contact 232 when the distributor carriage 40 reaches the limit of its forward traverse and is subsequently actuated by the other cam 363 to reclose its contact 227 and to reopen its contact 232 when the distributor carriage reaches the limit of its reverse traverse.

Operation

For the purpose of this description, it will be assumed that the leading end of the cable core 12 has been attached to the winding surface of the takeup reel 22 and that the stranding apparatus is in readiness for the start of an operation. It will be assumed further that it is desired to reel the finished cable core 12 upon the takeup reel 22 under a substantially constant tension of approximately 125 pounds, that the linear speed of the cable core will be maintained constant at 1,000 f.p.m. by the capstan and that the flyer 25 will operate at a speed of 1,000 r.p.m. Accordingly, the ganged switches 321—321, 322—322, 323—323 and 324—324 are set to establish approximately 1.53 ohms resistance in the secondary circuit of the induction machine 135.

Preparatory to the operation, the push-button switch 159 is closed momentarily to energize the operating coil 156 of the relay 155 which closes its contacts 161, 154—154 and 359—359. The relay 155 holds itself energized by virtue of the closure of its contact 161. The single-phase, A.C. lines 151 and 152 are now energized, and, likewise, the primary of the constant voltage transformer 355 is now energized. To commence the operation, the switch 167 is operated manually to its closed position, whereby the operating coil 162 of the relay 165 is energized simultaneously with the operating coil 172 of the time delay relay 175.

The energization of the operating coil 162 of the relay 165 causes the latter instantaneously to open its contacts 208 and 253 and to close its contacts 181 and 213. When the contact 253 opens, the solenoid 247 of the main drive shaft brake (not shown) is deenergized, whereby the main drive shaft 129 is free to rotate. The closure of the contact 181 of the relay 165 energizes the operating coil 178 of the relay 180 to close its contact 188 and contacts 296—296 instantaneously. With the contacts 296—296 closed, the main drive motor 125 is energized from the bus lines 150—150, whereupon the main drive shaft 129 commences to rotate and accelerates to its operating speed. The capstan 15, the twisting unit 16, the binding unit 18, and the flyer 25 all of which are driven from the main drive shaft 129 are thereby brought up to operating speed simultaneously. The contact 187 closes a predetermined time after the energization of relay 175, whereby the solenoid 193 of the relay 195 will be energized, after a predetermined time delay, to close contacts 298—298 to increase the voltage delivered to the motor 125 after the motor 125 has accelerated to a desired speed.

The rotation of the main drive shaft 129 causes the switch 197 to close so as to energize the operating coil 199 of the relay 200 thereby closing the contacts 207 and 242. The closure of the contact 242 energizes the operating coil 243 of the relay 245 to open its contact 288 which in turn results in the deenergization of the solenoid 285 of the clutch-brake coupling 104. The operation of the relay 245 also closes the contacts 263, 273 and 357—357. The distributor motor 52 is now energized from the bridge rectifier 347 through the closed contacts 357—357.

As the flyer 25 accelerates to its running speed, it wraps the cable core 12 upon the winding surface of the takeup reel 22. The distributor motor 52, which is energized from the bridge rectifier 347, drives the distributor carriage 40 at a predetermined constant speed, such that the first few convolutions of the cable core 12 during this relatively short acceleration period are wound uniformly upon the empty winding surface of the takeup reel 22. The takeup reel 22 is accelerated with the accelerating flyer 25 due to the pull of the cable core 12 extending from the flyer to the takeup reel. After a suitable time delay of approximately thirty seconds, during which time interval the flyer 25 has accelerated to its running speed of approximately 1,000 r.p.m. and the takeup reel 22 has been accelerated to the empty reel speed, the contact 187 of the time delay relay 175 closes to energize the operating coils 183, 189 and 193 of the relays 185, 190 and 195, respectively.

The operation of the relay 190 closes its contacts 301—301 to connect the primary circuit of the induction machine 135 to the bus lines 150—150. The induction machine 135, which is now driven at speed above its synchronous speed, operates as a generator transferring energy to the bus lines 150—150. With the induction machine 135 so connected, its torque-speed characteristic matches the line X—X' of Fig. 7-A, since it has been assumed that the secondary circuit has approximately 1.53 ohms resistance in each of the three phases. Since the torque-speed characteristic matches the line X—X' the tension on the cable core, as it is wound upon the takeup reel 22, remains substantially constant at the predetermined value of 125 lbs. throughout the reeling operation from the empty reel condition to the full reel condition, disregarding the relatively brief transient periods of acceleration and deceleration upon starting and stopping, respectively.

Throughout the entire reeling operation, the distributor carriage 40 is reciprocated to distribute the cable 10 in uniform layers upon the takeup reel. During the relatively brief acceleration period the distributor motor 52 runs at a predetermined constant speed, since its shunt field winding 330 and armature circuit both are energized from the bridge rectifier 347. However, as soon as the contact 187 of the time delay relay 175 closes, the relay 185 operates to close its contact 344 and to open its contacts 337—337, whereby the shunt field winding 330 subsequently is excited from the secondary circuit of the induction machine 135 through three-phase rectifier units 131 and 132, whereas the armature voltage is still supplied from the bridge rectifier 347.

When the takeup reel 22 is empty, the induction machine 135 is driven at a relatively low speed above its synchronous speed because of the relatively small winding radius. Under these conditions the distributor carriage 40 must travel relatively fast to distribute the cable core 12 uniformly upon the winding surface of the takeup reel 22. As the layers of convolutions build up and the winding radius of the takeup reel 22 increases, the rotational speed of the takeup reel increases proportionally and thus drives the induction machine 135 at proportionally higher speeds. Consequently, as the winding radius increases, the reciprocatory speed of the distribution carriage 40 must decrease proportionally.

Because of the fact that the shunt field winding 330 of the distributor motor 52 is excited from the secondary circuit of the induction machine 135, the required proportional decrease in speed of the distributor carriage 40 is achieved thereby. With the speed of the induction machine 135 becoming proportionally greater above its synchronous speed, as the winding radius increases, the slip of the induction machine increases to increase the secondary voltage thereof proportionally. This proportional increase in the secondary voltage of the induction machine 135 results in a proportionally greater rectified current passing through the shunt field winding 330 of the distributor motor 52. Consequently, the speed of the distributor drive motor 52 decreases proportionally with the increase in the winding radius of the takeup reel 22 to effect the uniform distribution of the convolutions of the cable core 12 upon its winding surface.

Figure 2:
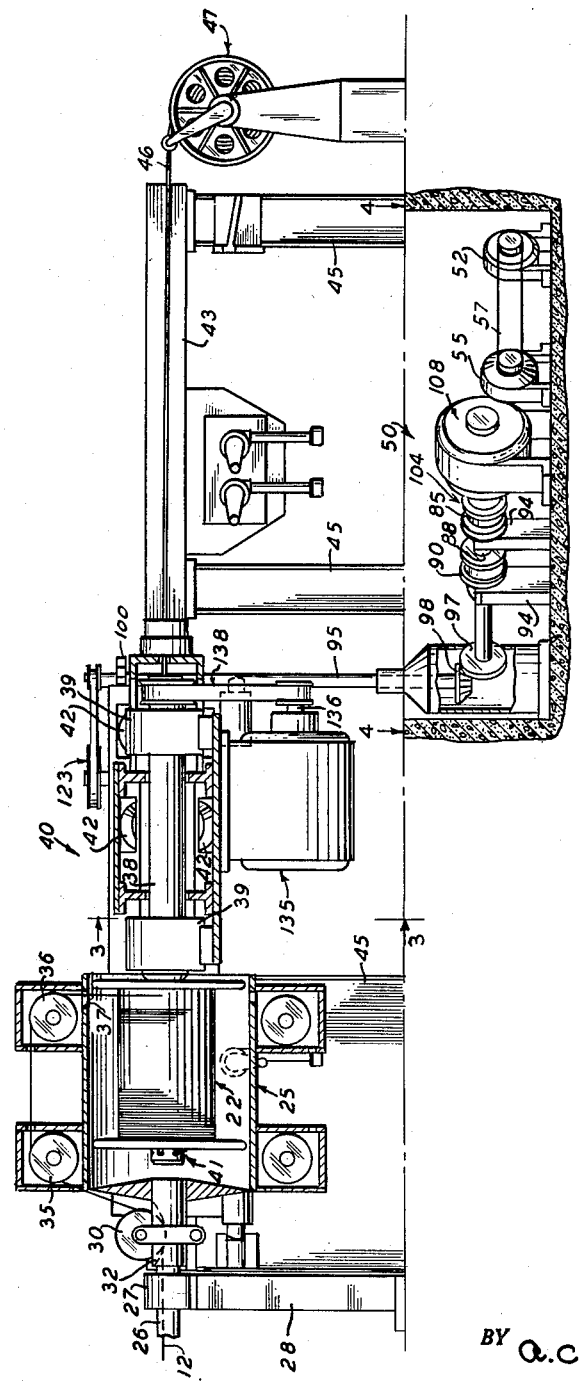
Fig. 2 is a fragmentary, vertical section taken along line 2—2 of Fig. 1–B, with parts thereof broken away for clarity.
Figure 6:
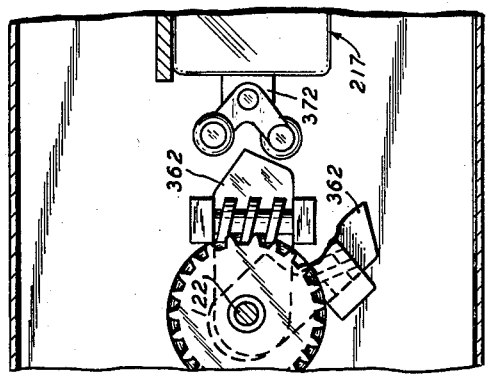
Fig. 6 is an enlarged, fragmentary, horizontal section taken along line 6—6 of Fig. 5, with parts broken away for clarity.

During part of its cycle, the distributor carriage 40 is moving forward to move the takeup reel 22 into the flyer 25 (i.e. moving to the left as viewed in Fig. 2), at which time the relays 220 and 225 and 245 are already energized. Accordingly, the contacts 261, 262 and 263 are closed so that the solenoid 259 of the electromagnetic clutch 62 (Fig. 4) is energized and the drive belt 86 is driven from the distributor drive motor 52 to move the distributor carriage in its forward direction.

As the distributor carriage 40 nears the limit of its forward traverse, the cam shaft 122 (Fig. 5) of the timing unit 120 reaches a position in which one of the cams 362—362 actuates the switch 217 to its closed position to energize the operating coil 214 of the relay 215. The relay 215 closes its contacts 295—295 to energize the booster motor 108 which at this time is not connected to the drive shaft 88. The booster motor 108 accelerates rapidly to its normal operating speed in the reverse direction and is fully accelerated by the time the distributor carriage 40 reaches the limit of its forward travel.

When the distributor carriage 40 attains the limit of its forward travel the cam shaft 122 of the timing unit 120 reaches a predetermined position wherein one of the cams 363—363 opens the contact 227 of the switch 230 and closes the contact 232. The coil 233 of the time delay relay 235 and the coil 237 of the relay 240 are energized. The operating coils 223 and 219 of the relay 225 and the time delay relay 220, respectively, are de-energized. The contact 261 of the relay 225 opens instantaneously to de-energize the solenoid 259 of the electromagnetic clutch 62 so that the drive belt 86 is disconnected from the distributor drive motor 52 and the distributor carriage 40 is no longer driven in a forward direction. Simultaneously the closure of the contact 293 of the relay 240 energizes the relay 280, and through the closure of its contacts 276 energizes the clutch solenoid 275 of the clutch-brake coupling 104 through the still closed contact 292 of the time delay relay 235. As the contact 276 of the relay 280 is closed, the contact 287 is opened releasing the booster motor brake.

Even though the operating coil 233 of the time delay relay 235 was energized by the closure of the contact 232 of the switch 230, its contact 292 remains closed until after a predetermined time delay. Accordingly, the drive shaft 88 is connected immediately to the booster motor 108 which is now running at full speed in its reverse direction. The booster motor 108 operates at a speed substantially higher than the empty reel speed of the distributor drive motor 52 so that the distributor carriage 40 begins to move in the reverse direction at a very high rate of speed to reverse rapidly the angle of wrap of the cable core 12 being wound upon the takeup reel 22 and thereby prevent the convolutions from tending to pile up adjacent to the reel flange.

The booster motor 108 is connected to the drive shaft 88 for only the relatively short period of time required to reverse the wrap angle and is then disconnected by the opening of the contact 292 of the previously energized time delay relay 235. Simultaneously with the disconnection of the booster motor 108 by opening of contact 276, contact 287 closes but does not energize the solenoid 285 of the booster motor brake 117 since the contact 288 will remain open during this portion of the cycle. Simultaneously, at the end of this time delay interval, the contact 272 of the time delay relay 235 closes and, through already closed contacts 271 and 273, energizes the solenoid 269 of the electromagnetic clutch 82 to connect the drive shaft 88 to the distributor drive motor 52 through the belt 92 whereupon the carriage 40 continues its movement in the reverse direction powered from the distributor drive motor 52, at a speed inversely proportional to the winding radius of the takeup reel 22. Subsequently the other cam 362 trips the operating lever 372 to reopen the switch 217 and de-energize the booster motor 108.

When the distributor carriage 40 nears the limit of its reverse traverse, one of the cams 361—361 operate the switch 212 to its closed position to energize the booster motor 108 in its forward direction through contacts 294—294 of the relay 210. Thereupon the booster motor 108 starts up and is fully accelerated by the time the distributor carriage 40 reaches the limit of its reverse traverse. When the distributor carriage 40 reaches the limit of its reverse traverse, the switch 230 is operated by the other of the cams 363—363 to close its contact 227 and open its contact 232. Immediately upon the closure of the contact 227, the operating coils 223 and 219 of the relay 225 and the time delay relay 220, respectively, are energized. The contacts 261 and 291 of the relay 225 close instantaneously and the clutch solenoid 275 of the clutch-brake coupling 104 is energized to connect the forward-running booster motor 108 to the drive shaft 88 so as to reverse the wrap angle of the cable core 12 rapidly in the manner hereinabove described. At the end of the short time delay the contact 290 of the time delay relay 220 reopens and its contact 262 closes, whereby the booster motor 108 is disconnected from the drive shaft 88 and the drive shaft 88 is connected to the distributor drive motor 52 through the drive belt 86 so that the distributor carriage 40 continues its movement in the forward direction powered by the distributor drive motor 52.

Subsequently the switch 212 is reopened by the other of the cams 361—361 to de-energize the booster motor 108.

The runout counter 170 is so designed that when the takeup reel 22 becomes full, the switch 169 opens automatically. When the switch 169 opens the main drive motor is de-energized and the phase of the voltage applied to the primary circuit of the induction machine 135 from the bus lines 150—150 is reversed by means of relay 190 which opens contacts 301—301 and relay 205 which closes contacts 302—302. This reversal in the phase of the voltage applied to the primary circuit of the induction machine 135 plugs the induction machine so as to rapidly stop with the takeup reel 22. Simultaneously, the solenoid 247 is re-energized through the now closed contact 253 so that the drive shaft brake (not shown) is applied to brake the main drive shaft 129 to a stop. Simultaneously, with the reversal of the phase of the voltage applied to the primary of the induction machine 135, the operating coil 183 of the relay 185 is de-energized and its contact 344 is opened and contacts 337—337 are closed so that the shunt field winding 330 is again energized from the bridge rectifier 347. As soon as the main drive shaft stops rotating the centrifugally-operated switch 197 reopens to de-energize the primary circuit of the induction machine 135 and to de-energize the distributor drive motor 52 by opening the contacts 357—357 of the relay 245. The full takeup reel 22 may now be removed from the arbor 38 and replaced by an empty takeup reel.

While the preferred form of the invention has been hereinabove shown and described, it is to be noted that some of the principles of the invention may be employed in a broader manner. The principal problem presented is to maintain a constant tension in a strand being wound on a takeup reel and the invention solves this problem by the use of at least one induction machine having a substantially linear speed torque characteristic for a range of rotational speeds which is between the speeds corresponding to the two breakdown torques. "Breakdown torque" as commonly used means the maximum torque that an induction machine will develop electrically. This condition occurs when the inductive reactance equals the resistances of the secondary circuit. The induction machine will develop a lower torque, at any speed above or below the breakdown-torque speed, than it will at the breakdown-torque speed. This is demonstrated in the drawings by the graphic illustration of curves of speed-torque characteristics of a particular induction machine on Figure 9 thereof. It should be noted that if vertical lines are drawn tangent to the curves at their most extreme left and right horizontal positions, those lines will intersect the abscissa at roughly 260 percent of full-load torque. Therefore, the breakdown torque is approximately 260 percent of full-load torque for the particular induction machine. This condition will occur at speeds both above and below synchronous speed of the induction machine. This will be true of the particular machine even if the resistance of the secondary circuit is varied to change the speed-torque characteristic thereof.

An alternative to the preferred form of the invention might be connecting the induction machine to the takeup reel by such a rotational speed ratio that the induction machine will rotate the takeup reel at faster speeds than that of the substantially constant speed flyer. Because for an induction machine the plot of torque against speed at speeds greater than synchronous is a mirror image of such a plot at speeds less than synchronous as is shown in Fig. 9, equivalent winding results to those of the above-described example would be achieved.

Referring to Fig. 7–B, there is shown, merely by way of illustrative example, a curve designated "A" which represents a plot of the rotational speed ($\omega_r$) of the takeup reel 22 versus the required driving torque ($T_1$) necessarily produced by the induction machine for the following hypothetical conditions:

$S=1000$ f.p.m.
$\omega_f=1000$ r.p.m.
$F=125$ lbs.
$\omega_r>1000$ r.p.m.

Since these conditions are the same as those used to describe the preferred embodiment as shown in Fig. 7–A with the exception that $\omega_r>1000$ r.p.m. the resulting curve A of Fig. 7–B is a mirror image of that shown in Fig. 7–A so that the graphs are symmetrical about an ordinate axis at 1000 r.p.m., which is the speed of the flyer 25. Using the same winding diameters for full and empty reel conditions, two feet and one foot, respectively, and plotting a straight line through the resulting points on curve A of Fig. 7–B, locates the "zero-torque," takeup reel speed at 1485 r.p.m. Therefore, in order to maintain a constant tension in the strand with the takeup reel 22 rotating faster than the flyer 25, the induction machine 135 should be geared to the takeup reel so that synchronous speed of the induction machine produces a rotational speed of the takeup reel equal to 1485 r.p.m. Curve B shows the torques necessary to produce a tension in the strand of 63 lbs.

Another alternative to the preferred form of the invention might comprise replacing the induction machine 135 of the preferred embodiment with a power transmission of the type having a substantially linear speed-torque characteristic for a range of rotational speeds just adjacent to and above zero speed. The use of such a device would make possible operation of the takeup apparatus at the smaller takeup reel diameters represented by points to the left of X and X' on the curve "A" of Fig. 7–A. A commercial example of such a power transmission is a Whitney-Tormag Magnetic Drive having a substantially linear speed-torque characteristic between zero speed and 5% slip and manufactured by the Whitney Chain Company, Hartford, Connecticut.

Assuming that the strand reeling device embodying the invention is operating in tandem with apparatus in which it is not required that the strand be delivered at a fixed rate to the takeup reel, other alternatives can be conceived. For example, the induction machine 135 could be connected to a flyer 25 which would rotate at varying faster or slower speeds than an associated constant speed takeup reel. However, whatever possible alternative that is selected the secondary or rotor circuit resistance of the induction machine 135 or machines will be preselected so as to preset the magnitude of tension on the strand as it is wound on the takeup reel 22. The strand tension will be maintained at a constant value because of a preselected fixed rotational speed ratio between the induction machine 135 and the flyer 25 or takeup reel 22 to which it is connected and because the reeling apparatus is operated in a speed range in which the speed-torque characteristic of the induction machine 135 is substantially linear and has a positive slope.

An alternative embodiment, within the scope of the invention which perhaps is not quite as obvious from the above discussion as other alternative embodiments is the use of two substantially equally powered induction machines; one for the flyer and one for the takeup reel. Such an alternative embodiment would be useful in a situation where it is not required that the strand be delivered at a constant rate. In choosing the fixed gear ratios between the flyer and takeup and their respective machines and in choosing the amount of resistance for the secondary circuits of the two machines, the important factor would be the total amount of slip between the two machines because the torques produced by both machines would vary linearly with speed as the winding diameters varied. However, the same principles would apply, namely, choosing a preselected fixed rotational speed ratio between each machine and its respective takeup reel or flyer to make strand tension constant, choosing resistance values for the two secondary circuits to set the magnitude of tension desired and operating the apparatus in a speed range in which the speed-torque characteristics of the two induction machines are substantially linear. It, therefore, can be understood that the methods and apparatus hereinabove described in detail are merely explanatory and that manifestly various other types of methods and apparatus may be devised within the separate ends of this invention.

For more information regarding the strand distributing mechanism disclosed herein, reference is made to my application Serial No. 624,867, entitled "Methods of and Apparatus for Distributing Strand Material," filed on even date herewith.

What is claimed is:

1. Apparatus for reeling strand material, comprising flyer means, reel means connected operatively mechanically to said flyer means, means for rotating one of said means solely by the strand material extending therebetween, governing means constraining the movement of the strand material to the reel by controlling the linear speed thereof, and an induction machine connected to the other of the first two mentioned means for developing torque for effecting continuous predetermined differences in rotational speed of said other of said first two mentioned means with respect to said one of said means.

2. Apparatus for reeling strand material at a constant tension, comprising a rotatable flyer, means to rotate the flyer at a constant speed, a takeup reel connected operatively mechanically to said flyer solely by the strand material extending therebetween for receiving the strand material from said flyer and rotated by the strand material as said flyer is rotated, an induction machine connected to said reel in a predetermined fixed rotational speed ratio, governing means constraining the movement of the strand material to the reel by controlling the linear speed thereof and means to operate said induction machine at speeds in excess of its synchronous speed, whereby it has a braking effect on said reel and provides a constant tension on the strand material.

3. Apparatus for maintaining a constant tension in a strand being wound on a reel comprising a rotatable takeup reel operable at a substantially constant rate of rotational speed, a rotatable flyer mounted coaxially with and connected operatively, mechanically to said takeup reel solely by the strand extending therebetween, means for causing relative axial movement between the reel and the flyer for distributing the strand on the reel, an induction machine having a substantially linear portion in its speed-torque characteristic between synchronous speed and a breakdown torque speed connected to said flyer in a predetermined fixed rotational speed ratio, governing means constraining the movement of the strand to the reel by controlling the linear speed thereof, and energizing means cooperating with the reaction of the strand for operating said induction machine between breakdown-torque speeds and in the region where the machine has the substantially linear speed-torque characteristic whereby, as a strand is delivered at a substantially constant linear speed to said rotating flyer and thence to said rotating reel, the torque which varies in accordance with the portion of the characteristic of the induction machine in the region of operation is developed by the induction machine acting through said flyer to maintain a constant tension in the strand.

4. Apparatus for maintaining a constant tension in a strand being wound on a reel comprising a rotatable flyer, a rotatable takeup reel mounted coaxially with and connected operatively, mechanically to said flyer solely by the strand extending therebetween, means for causing relative axial movement between the reel and the flyer for distributing the strand on the reel, a first induction machine having a substantially linear portion in its speed-torque characteristic between its two breakdown-torque speeds being connected to said takeup reel in a predetermined fixed rotational speed ratio, a second induction machine having a substantially linear portion in its speed-torque characteristic between its two breakdown-torque speeds being connected to said flyer in a second predetermined fixed rotational speed ratio, governing means constraining the movement of the strand to the reel by controlling the linear speed thereof, and energizing means cooperating with the reaction of the strand for operating said induction machines between the breakdown-torque speeds thereof and in the region where the machines have the substantially linear portion in their speed-torque characteristics with said first induction machine operating at a speed below synchronous speed and said second induction machine operating at a speed above synchronous speed the ratios being of a value, whereby, as said machines are operated to produce relative rotation of the flyer with respect to the reel and as the strand is delivered to said rotating flyer at a linear speed proportional to the rotational speed of said flyer and delivered thence to said rotating reel, a constant tension is maintained in the strand.

5. The apparatus of claim 4 in which the energizing means cooperates with the reaction of the strand for causing said first induction machine to drive the takeup reel at a rotational speed faster than that of the flyer and faster than the synchronous speed of said first induction machine so as to maintain a constant tension in the strand being wound thereon.

6. Apparatus for maintaining a constant tension in a strand being wound on a reel comprising a rotatable flyer operable at a substantially constant rate of rotational speed, a rotatable takeup reel mounted coaxially with and connected operatively mechanically to said flyer solely by the strand extending therebetween, means for causing relative axial movement between the reel and the flyer for distributing the strand on the reel, an induction machine having a substantially linear portion in its speed-torque characteristic between synchronous speed and a breakdown-torque speed connected to said takeup reel in a predetermined fixed rotational speed ratio, means for rotating the flyer at a substantially constant rate of rotational speed, governing means constraining the movement of the strand to the reel by controlling the linear speed thereof, and energizing means cooperating with the reaction of the strand for operating said induction machine between the breakdown-torque speeds and in the region where the machine has the substantially linear portion in its speed-torque characteristic whereby, as a strand is delivered at a substantially constant linear speed to said rotating flyer and thence to said rotating reel, the torque developed by the induction machine acting through said reel maintains a constant tension in the strand.

7. Apparatus for maintaining a constant tension in a strand being wound on a reel comprising a rotatable flyer operable at a substantially constant rate of rotational speed, a rotatable takeup reel mounted coaxially with and connected operatively, mechanically to said flyer solely by the strand extending therebetween, means for causing relative axial movement between the reel and the flyer for distributing the strand on the reel, a driven means having a substantially linear portion in its speed-torque characteristic at speeds above a no-load rotational speed being connected to said takeup reel in a predetermined fixed rotational speed ratio, means for rotating the flyer at a substantially constant rate of rotational speed, governing means constraining the movement of the strand to the reel by controlling the linear speed thereof, and energizing means cooperating with the reaction of the strand for operating said driven means above the no-load rotational speed and in the region where the driven means has the substantially linear portion in its speed-torque characteristic whereby, as a strand is delivered at a constant linear speed to said rotating flyer and thence to said rotating reel, the braking torque of said driven means acting through the reel maintains a constant tension in the strand.

8. Apparatus for maintaining a constant tension in a strand being wound on a reel comprising a rotatable flyer operable at a substantially constant rate of rotational speed, a rotatable takeup reel mounted coaxially with and connected operatively, mechanically to said flyer solely by the strand extending therebetween, means for causing relative axial movement between the reel and the flyer for distributing the strand on the reel, an induction machine having a substantially linear portion in its speed-torque characteristic between synchronous speed and a higher, breakdown-torque speed being connected to said takeup reel in a predetermined fixed rotational speed ratio, means for rotating the flyer at a substantially constant rate of rotational speed, governing means constraining the movement of the strand to the reel by controlling the linear speed thereof, and energizing means cooperating with the reaction of the strand for operating said induction machine between the breakdown-torque speeds and in the region where the machine has the substantially linear portion in its speed-torque characteristic whereby, as the strand is delivered at a constant linear speed to said rotating flyer and thence to said rotating reel, the braking torque of said induction machine acting through the reel maintains a constant tension in the strand.

9. Apparatus for maintaining a constant tension in a strand being wound on a reel comprising a rotatable flyer operable at a substantially constant rate of rotational speed, a rotatable takeup reel mounted coaxially with and connected operatively, mechanically to said flyer solely by the strand extending therebetween, means for causing relative axial movement between the reel and the flyer for distributing the strand on the reel, an induction machine having a substantially linear portion in its speed-torque characteristic between synchronous speed and a breakdown-torque speed connected to said takeup reel in a predetermined fixed rotational speed ratio, means for rotating the flyer at a substantially constant rate of rotational speed, governing means constraining the movement of the strand to the reel by controlling the linear speed thereof, and energizing means cooperating with the reaction of the strand for operating said induction machine between the breakdown-torque speeds and in the region where the machine has the substantially linear portion in its speed-torque characteristic whereby, as the strand is delivered at a substantially constant linear speed to said rotating flyer and thence to said rotating reel, the torque developed by the induction machine acting through the reel maintains a constant tension in the strand, the rotor circuit of the induction machine having a predetermined resistance therein whereby the tension in the strand is maintained at a desired predetermined magnitude throughout the reeling operation.

10. Apparatus for maintaining a constant tension in a strand being wound on a reel comprising a rotatable flyer operable at a substantially constant rate of rotational speed, a rotatable takeup reel mounted coaxially with and connected operatively, mechanically to said flyer solely by the strand extending therebetween, a wound rotor induction machine having a substantially linear portion in its speed-torque characteristic between synchronous speed and a higher, breakdown-torque speed, transmission means connecting the rotor of said induction machine to said takeup reel in a predetermined fixed rotational speed ratio, means for rotating the flyer at a substantially constant rate of rotational speed, governing means constraining the movement of the strand to the reel by controlling the linear speed thereof, energizing means cooperating with the reaction of the strand for operating said induction machine between the breakdown-torque speeds in the region where the machine has the substantially linear portion in its speed-torque characteristic whereby, as a strand is delivered at a constant linear speed to said rotating flyer and thence to said rotating reel the braking-torque of the induction machine acting through the reel maintains a constant tension in the strand, and strand distributing means for reciprocating the takeup reel axially at a rate in inverse proportion to the magnitude of voltage in the rotor circuit whereby the strand is distributed uniformly upon the winding surface of the takeup reel.

11. Apparatus for maintaining a constant tension in a strand being wound on a reel comprising a rotatable flyer operable at a substantially constant rate of rotational speed, a rotatable takeup reel mounted coaxially with and connected operatively, mechanically to said flyer solely by the strand extending therebetween, a wound rotor induction machine having a substantially linear portion in its speed-torque characteristic between synchronous speed and a higher, breakdown-torque speed, transmission means connecting the rotor of said induction machine to said take-up reel in a fixed rotational ratio, means for rotating the flyer at a substantially constant rate of rotational speed, governing means constraining the movement of the strand to the reel by controlling the linear speed thereof, energizing means cooperating with the reaction of the strand for operating said induction machine between the breakdown-torque speeds and in the region where the machine has the substantially linear portion in its speed-torque characteristic whereby, as a strand is delivered at a constant linear speed to said rotating flyer and thence to said rotating reel the braking-torque of said induction machine acting through the reel maintains a constant tension in the strand, strand distributing means operable for reciprocating the takeup reel axially, a direct current motor provided with a separately excitable field winding operatively connected to the strand distributing means so as to reciprocate the takeup reel axially, and means for separately exciting said field winding with a voltage proportional to the rotor current of the induction machine whereby the strand is distributed uniformly upon the winding surface of the takeup reel.

12. Apparatus for maintaining a constant tension in a strand being wound on a reel comprising a rotatable flyer operable at a substantially constant rate of rotational speed, a rotatable takeup reel mounted coaxially with and connected operatively, mechanically to said flyer solely by the strand extending therebetween, a wound rotor induction machine having a substantially linear portion in its speed-torque characteristic between synchronous speed and a higher, breakdown-torque speed being connected to said takeup reel in a predetermined fixed rotational speed ratio, means for rotating the flyer at a substantially constant rate of rotational speed, governing means constraining the movement of the strand to the reel by controlling the linear speed thereof, and energizing means cooperating with the reaction of the strand for operating said induction machine between the breakdown-torque speeds and in the region where the machine has the substantially linear portion in its speed-torque characteristic whereby, as the strand is delivered at a constant linear speed to said rotating flyer and thence to said rotating reel, the braking torque of said induction machine acting through the reel maintains a constant tension in the strand, the rotor circuit of the induction machine having a predetermined resistance therein, said resistance being capable of decreasing as the voltage across said resistance increases, whereby the tension in the strand is maintained at a desired predetermined magnitude throughout the reeling operation.

13. Apparatus for reeling strand material comprising flyer means, reel means connected operatively, mechanically to said flyer means solely by the strand material extending therebetween, means having a straight line portion in its speed-torque characteristic for rotating one of said means, an induction machine connected to the other of said means for causing relative rotational movement between said flyer and said reel means, a rotor circuit in said induction machine, governing means constraining the movement of the strand to the reel by controlling the linear speed thereof, energizing means cooperating with the reaction of the strand for operating said induction machine between breakdown-torque speeds and in the region where the machine has the straight line speed-torque characteristics and strand distributing means for reciprocating the reel means axially at a rate in inverse proportion to the magnitude of voltage in said rotor circuit, whereby the strand is distributed uniformly upon the winding surface of the reel means.

14. A method of maintaining tension in strand material which is being advanced through a flyer and being wound upon a rotatable take-up reel, which comprises supplying the strand material to and through the flyer and to the reel onto which it is being wound while controlling the linear speed thereof, revolving a constant-dimensional bight of the strand material consisting of successive portions of the strand material being advanced continuously through the flyer and confined thereby at a predetermined, variable, revolving speed about the longitudinal axis of the reel by applying a variable torque to the flyer, maintaining the torque applied to the flyer proportionate to the speed of revolution thereof, causing the portion of the strand material extending between the flyer and the reel at any instant to exert a force between the flyer and the winding surface of the reel, rotating the reel at a predetermined, variable, rotational speed, maintaining a torque on the reel which is proportionate to the rotational speed thereof for reacting against the force applied to the winding surface of the reel by the strand material, and thereby causing a desired amount of tension to be established in the portion of the strand extending between the flyer and the reel at any instant as the strand is wound upon the take-up reel, whereby the only mechanical energy which is exchanged between the flyer and the take-up reel is that which is exchanged through the successive portions of the strand material extending from the flyer to the take-up reel by the force exerted therebetween.

References Cited in the file of this patent
UNITED STATES PATENTS

| | | |
|---|---|---|
| 2,329,130 | Nelson | Sept. 7, 1943 |
| 2,351,669 | Dentzer et al. | June 20, 1944 |
| 2,722,639 | Shaad | Nov. 1, 1955 |

UNITED STATES PATENT OFFICE
CERTIFICATE OF CORRECTION

Patent No. 2,931,589                                              April 5, 1960

Tillman T. Bunch

It is hereby certified that error appears in the printed specification of the above numbered patent requiring correction and that the said Letters Patent should read as corrected below.

Column 4, line 31, for "Clutch Company" read -- & Clutch Company --; line 67, strike out "mounted"; column 12, line 9, for "contacts" read -- contact --; column 14, lines 65 and 66, for "delovered" read -- delivered --; column 15, lines 20 and 21, strike out "solely by the strand material extending therebetween" and insert the same after "means", first occurrence, and before the comma in line 19, same column 15.

Signed and sealed this 11th day of October 1960.

(SEAL)

Attest:

KARL H. AXLINE
Attesting Officer

ROBERT C. WATSON
Commissioner of Patents